Figure 1:
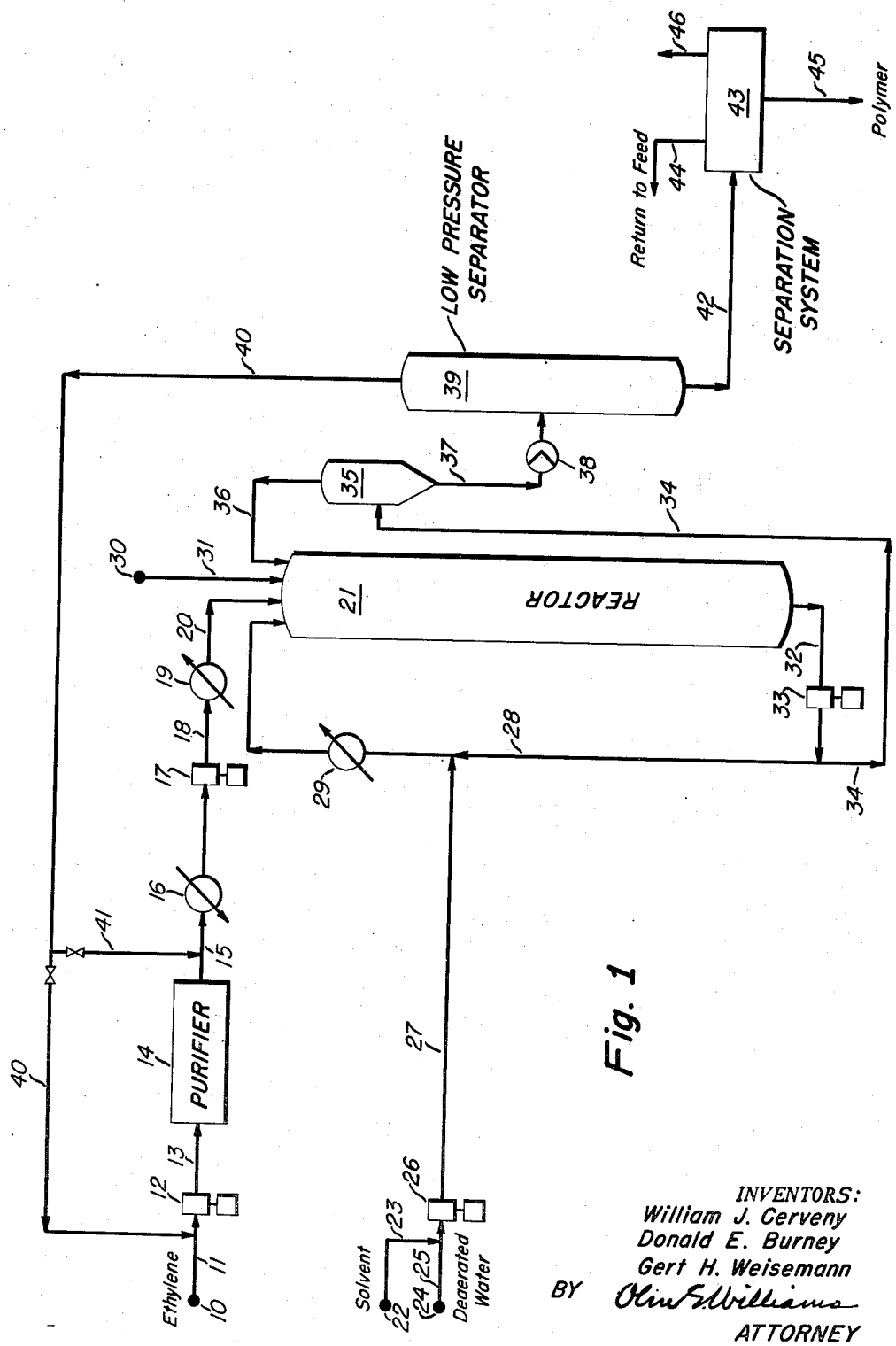

INVENTORS:
William J. Cerveny
Donald E. Burney
Gert H. Weisemann
BY *Oliv F. Williams*
ATTORNEY INVENTORS:
William J. Cerveny
Donald E. Burney
Gert H. Weisemann

BY

ATTORNEY

Patented Aug. 3, 1954

2,685,577

UNITED STATES PATENT OFFICE 2,685,577

ETHYLENE POLYMERIZATION PROCESS

William J. Cerveny, Lansing, Ill., and Donald E. Burney, Griffith, and Gert H. Weisemann, Hobart, Ind., assignors to Standard Oil Company, Chicago, Ill., a corporation of Indiana Application May 21, 1952, Serial No. 289,164

10 Claims. (Cl. 260—94.9)

This invention relates to an improved process of polymerizing ethylene to produce solid, high-molecular-weight polyethylene. The invention has particular reference to an improved ethylene polymerization process employing as a catalyst peroxydicarbonate esters (also termed diformate peroxides or dioxydiformates) having the general formula

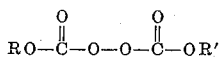

wherein R and R' are organic radicals, preferably alkyl radicals of less than 5 carbon atoms. The polymerization of ethylene in the presence of peroxydicarbonate esters is described in U. S. Patents 2,475,628; 2,475,643; and 2,475,648.

A primary object of this invention is the provision of improvements in an ethylene polymerization process employing the above catalyst and a product carrier liquid that is present in separate phase during polymerization whereby there is produced a polyethylene of uniform, improved quality. Another object of the invention is the provision of an improved ethylene polymerization process, employing the above catalyst, in which a carrier liquid is provided to carry ethylene polymer from the raction zone and in which the carrier liquid is readily separable, along with extracted product, from unreacted ethylene and catalyst.

Another object of the invention is the provision of an improved process of polymerizing ethylene to obtain normally solid polymers in the presence of a substantial volume of a product-carrier liquid whereby deposition of polymer on reactor walls or other equipment is substantially completely avoided. Yet another object of the invention is the provision of a multiple phase ethylene polymerization system whereby a polyethylene of uniform, unimpaired high quality is produced, and in which polyethylene transfers, from at least one polymerization phase, into a separate aqueous carrier phase and is readily carried, as a dispersion in the aqueous phase, from the reactor. A further object of this invention is the provision of a process of ethylene polymerization in the presence of an aqueous product-carrier liquid that will not interfere with product quality. The invention has for other objects such other advantages or results as will be found in the ensuing description and claims.

This invention comprises the catalytic polymerization of ethylene in at least one discrete ethylene phase dispersed by constant agitation in a separate aqueous phase that is between 25 and 90 percent of the total weight of the reaction mixture and contains in solution an alcohol selected from the group consisting of methanol and tertiary butanol. It is essential to maintain the relative volume of the aqueous phase within the above limits to provide a normally solid polyethylene of uniform high quality. The aqueous phase can contain between 5 and 40 percent, by weight based on the total weight of this phase, of said alcohol. The ethylene is present in dense gaseous phase and may be present, in part, in a separate ethylene phase in solution in a portion of the alcohol, this latter phase providing an excellent polymerization medium. It is, in addition, essential that not more than 30 percent and preferably not more than about 15 percent by weight of polyethylene based on the weight of the total aqueous slurry of polymer be permitted to accumulate in the slurry in order that the slurried polymer can be readily removed from the reactor.

In carrying out the process of this invention, ethylene is polymerized in the presence of a peroxydicarbonate ester catalyst and in the presence, as a separate phase, of the said aqueous solution of selected alcohol under pressures between about 4000 and 20,000 pounds per square inch gauge and at temperatures between about 30° and 100° C. and preferably between about 55° and about 90° C. The catalyst is introduced into the reaction zone either in undiluted form or in solution in an organic solvent or water, preferably in quantities of 0.001 to 1.0 weight percent of catalyst based on the weight of ethylene contacted (including externally recycled but not internally recycled ethylene). The reaction system must be continuously agitated so as to provide a thorough intermixing of the ethylene and, if present, the ethylene-alcohol phase, in the aqueous phase because the ethylene phase is not dispersed in finely divided form as an emulsion in the aqueous phase and no stable dispersion of the two phases is obtained. The dense ethylene phase, not being an emulsion, can be either the continuous phase or the discontinuous phase, the latter phase providing special advantages, hereinafter noted.

The agitation of the system is preferably accomplished by providing a recycle of the reactor contents; recirculation in the range of 0.2 to 2 reactor volumes per minute depending on the size of the reactor will provide adequate intermixing of these phases. A portion of the intermixed phases is continuously withdrawn and immediately released to a relatively low pressure zone wherein excess ethylene is flashed from the mixture. A slurry of the polymer in the aqueous solution of alcohol is separated by the flash evaporation of ethylene and is delivered to drying, washing, filtering, and similar product separation means. The aqueous alcohol solution effectively wets the polymer and the polymer slurry can contain as high as about 20 percent or, momentarily, even as high as 30 percent by weight of polyethylene based on the weight of the slurry. However, for ease of handling the slurry will preferably contain no higher than about 15 percent by weight of polymer, concentrations of polymer in slurry above this latter figure constituting extremely heavy pastes.

The product is readily separated from the slurry in aqueous alcohol, for example, by filtration or by distilling, under a vacuum, the alcohol solution from the product.

In the aqueous solution of an alcohol selected from the group consisting of methanol and tertiary butyl alcohol the alcohol is present in a concentration between about 5 and 40 percent, and preferably between about 10 percent to about 25 percent by weight based on the total weight of the aqueous phase. Concentrations as high as 40 percent can be employed without substantial interference with the polymerization reaction as would be shown by the production of polyethylene of lower molecular weight than is usually considered commercially desirable. The selected alcohols surprisingly do not exhibit the almost universal characteristic of other solvents of interfering with the polymerization reaction so as to cause the formation of inferior polymer.

The relative volume of water-alcohol phase with respect to the total reaction volume that includes also the dense ethylene phase must also be maintained within limits to provide the improved polyethylene product. Between 25 and 90 percent of the total volume of the reaction mixture can be the aqueous solution of selected alcohol. It is suggested merely as a theory that a relative weight of aqueous phase greater than 90 percent of the total weight impairs product quality by permitting the solution of excessive quantities of the catalyst in the aqueous phase, thereby diluting the ethylene phase with respect of catalyst wherein the reaction should occur. When the aqueous phase is present in such large volumes, some solution of the ethylene in the aqueous phase will occur, in which case some ethylene would polymerize in an unfavorable environment. It is difficult to remove polymer from the reactor when relative weights of aqueous phase less than 25 percent are employed.

Figure 2:
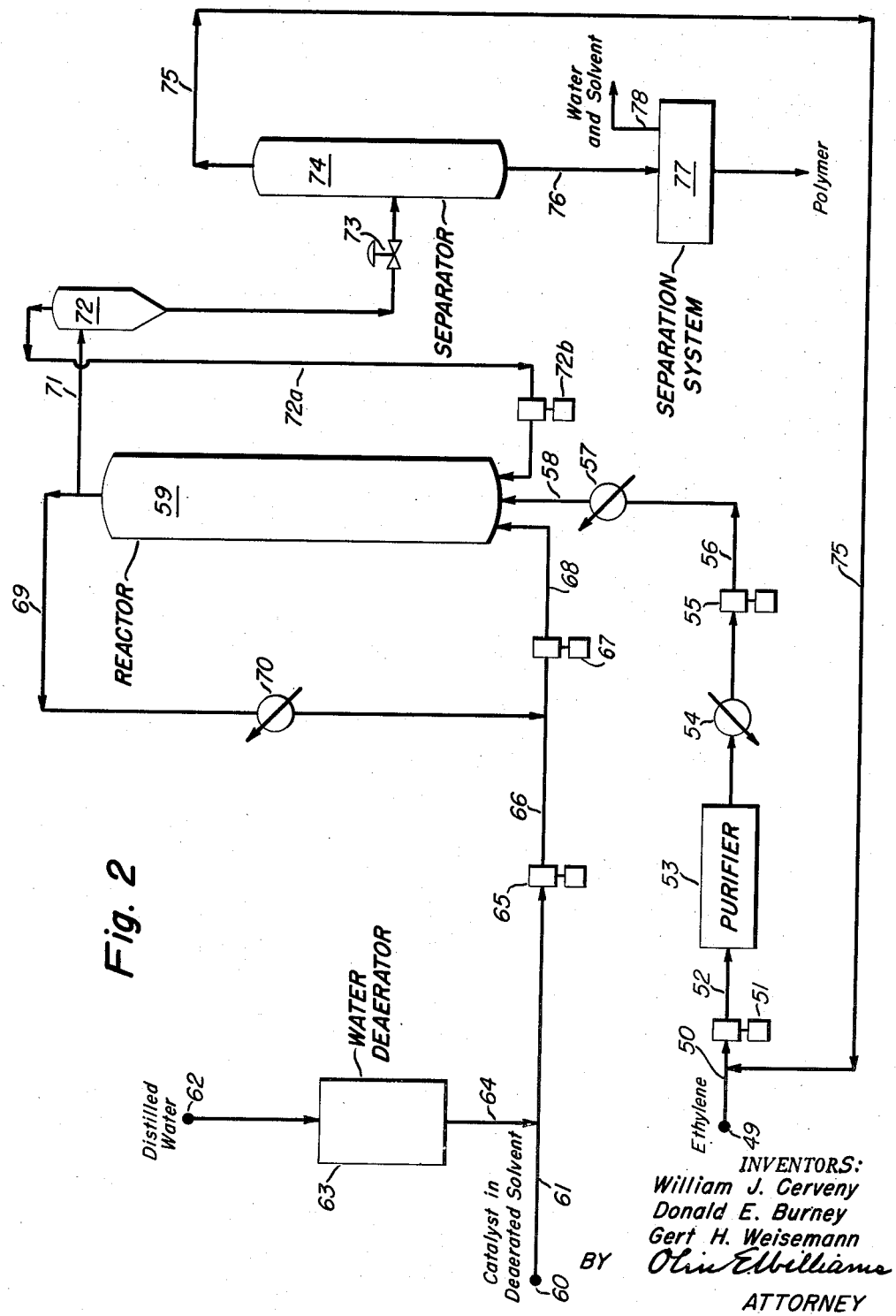

In the accompanying drawings, Fig. 1 is a flow diagram illustrating schematically the process of the present invention in which recycle is employed to provide agitation and mixing of the two-phase system; and Fig. 2 is a flow diagram illustrating schematically the process of invention in which the recycle is employed to provide agitation and mixing of the two-phase system, and in which a preferred means of admixing the said phases is employed wherein the ethylene phase is the discontinuous phase.

In the process as illustrated with specific reference to Fig. 1, commercial ethylene is delivered from a source 10 through a line 11 and is pumped by a compressor 12 through a line 13 into a purifier 14 wherein the ethylene is treated to reduce the oxygen content of the ethylene to less than about ten parts by weight per million. Treatment in purifier 14 preferably constitutes passing the ethylene at a pressure of about 1000 pounds per square inch gauge and at a temperature in the range of 150° to 200° C. through a bed of reduced copper oxide. Purified ethylene leaves purifier 14 and passes through line 15 and cooler 16 in which the ethylene is cooled to a temperature of about −15° C. The liquefied and purified ethylene is pumped by a pump 17 through a line 18 and heat exchanger 19 and is passed at a pressure of about 15,000 pounds per square inch gauge and a temperature between about 55° and 100° C., through a line 20 into the top of the reactor 21.

Tertiary butyl alcohol which has been deaerated by heating and stirring is flowed from a source 22 through a line 23 into which distilled and deaerated water is directed from a source 24 and line 25. The so-formed aqueous solution of tertiary butyl alcohol, which may have a concentration of alcohol between about 10 and 25 percent, by weight, is pumped by pump 26 at a pressure of about 15,000 pounds per square inch gauge through lines 27 and 28 and heat exchanger 29 into the top of the reactor 21.

Diethylperoxydicarbonate catalyst is delivered from a source 30 preferably in solution in an organic solvent through a line 31 into the said reactor 21 at a rate such as to maintain the catalyst introduction between about 0.001 and 1.0 percent by weight based on the introduction of ethylene through line 20. If undiluted catalyst is directly introduced into the reactor it should be stored at low temperature, for example 0° C. or less, and be delivered through the said line 31 at low temperature.

The reaction mixture which includes the mixed phases, the catalyst, and product, is withdrawn from reactor 21 through line 32 and is recycled at reaction pressure by a pump 33 through line 28 and heat exchanger 29 into the said reactor. Although this recycle is external to vessel 21 it is generally called internal recycle since this recycle constitutes in fact a portion of the polymerization zone.

A portion of the reaction mixture from the discharge side of pump 33 is introduced by line 34 to cyclone separator 35 for separating the lighter ethylene-alcohol phase from the heavier alcohol-water-polymer phase, the lighter ethylene-alcohol phase being returned by line 36 to the top of reactor 21 as another portion of so-called internal ethylene recycle. Alternatively, the portion of the reaction mixture may be withdrawn from line 32 or from the base of the reactor to cyclone separator 35 but in this case a compressor is required in line 36. The amount of the total reactor effluent which is withdrawn from the system to separator 35 will be dependent on the nature of the catalyst, conversion conditions, etc. and will be selected to prevent the stream recycled through line 28 from becoming too viscous, i. e., from containing more than 15 to 30 percent of product polymer. Preferably about 3 to 30 or about 10 parts of reactor effluent are recycled through line 28 for each part withdrawn through line 34.

The heavier water-alcohol-polymer phase is withdrawn from cyclone separator 35 through line 37 and pressure reducing valve 38 to low pressure separator 39 which may be operated at about atmospheric pressure to approximately 1000 p. s. i. g.; when operated at atmospheric pressure, the liberated ethylene may be recycled through line 40 to line 11 and when operated at an intermediate pressure of the order of 800 to 1000 p. s. i., the liberated ethylene may be returned by lines 40 and 41 to line 15. This is referred to as external ethylene recycle and such recycled ethylene may be considered a part of the ethylene charge.

A slurry of tertiary butyl alcohol, water, and product is withdrawn from the low pressure separator 39 through a line 42 and is delivered to product separating means 43, which preferably includes means for vacuum distilling tertiary butyl alcohol and water from the polymerized products. Distillation of the tertiary butyl alcohol and water solution effects a separation of an azeotrope containing about 88 percent tertiary butyl alcohol and 12 percent water. This azeotrope can be returned through a line 44 into line 27 and be delivered again into the reactor to be used to adjust the solution to proper concentration. Alternatively the product can be filtered to recover polymer or all of the tertiary butyl alcohol and water can be evaporated from the polymer and be delivered through the line 44 into the tertiary butyl alcohol-water-system. Polyethylene having an average molecular weight in the range of about 10,000 to 50,000 is withdrawn from the product separating means 43 by line 45 and is thereafter subjected to conventional drying, milling and other refining means not shown. Any ethylene released in the separation system is withdrawn through line 46.

The foregoing flow diagram embodies a process wherein concentration of polymer at least as high as 15 to 20 percent by weight of total slurry can be recovered from the reactor and be withdrawn at a rate so as to provide an ethylene residence time in the reactor from between about 5 minutes and about 5 hours.

In the process of Fig. 1 the ethylene-tertiary butyl alcohol phase is the continuous phase in which the aqueous solution phase of tertiary butyl alcohol is dispersed or suspended. The ethylene phase has been found to be the primary, if not the sole polymerization medium. It appears that upon formation of polymer this product transfers immediately to the aqueous solution, and consequently an aqueous slurry of polyethylene is thereby formed. The degree of recirculation and consequent agitation hereinabove prescribed ordinarily provides sufficient contact of the two phases so that the major portion of polyethylene is delivered into the aqueous slurry and the aqueous alcohol phase remains in suspension.

An embodiment wherein the requirement for agitation and intermixing is not so great and wherein an ethylene phase is dispersed discontinuously throughout an aqueous phase is illustrated in Fig. 2. Referring now to Fig. 2, ethylene of commercial quality is delivered from the source 49 in a manner similar to the process of Fig. 1 through a line 50, a compressor 51, a line 52, a purifier 53, a cooler 54 and is pumped by a pump 55 to a pressure of about 15,000 pounds per square inch through a line 56 in which is disposed a heat exchanger 57. The ethylene is compressed to reactor pressure and heated to a temperature between about 55° and 100° C. and delivered through a line 58 into the reactor 59.

A dialkyl peroxydicarbonate catalyst which is usually stored at about 0° C. or below, is dissolved in a solvent such as tertiary butyl alcohol and is delivered from a source 60 in a line 61 for admixture with water from source 62 which is deaerated in system 63 and introduced through line 64. Peroxydicarbonate ester catalyst is decomposed in the presence of alcohol-free water but is relatively stable in small concentration and in solution in aqueous tertiary butyl alcohol. The catalyst can thus be delivered into the reactor 59 without fear of premature catalyst decomposition. The aqueous solution of tertiary butyl alcohol and water is pumped to reactor pressure by pump 65 and introduced through a line 66 into the reactor recycle system comprising recycle pump 67 and inlet line 68 whereby the aqueous solution of tertiary butyl alcohol is introduced into the reaction zone.

The introduced ethylene and aqueous tertiary butyl alcohol solution admix in the reactor and some tertiary butyl alcohol dissolves in the ethylene phase. Reaction is effected at pressures between about 4000 and 20,000 pounds per square inch gauge and a temperature between about 55° and 100° C. The reaction mixture is pumped by the said pump 67 through a line 69 in which is disposed a heat exchanger 70. The rate of circulation is maintained between about 0.2 and 2 reaction volumes per minute. The reaction is slightly exothermic and overheating is avoided by employment of the heat exchanger 70 as a cooler.

A portion of the reaction mixture (as described in connection with Fig. 1) is withdrawn from the reactor 59 or recycle line 69 through a line 71 to cyclone separator 72 from which the separated ethylene-alcohol phase may be returned by line 72a and pump 72b to the reactor. The water-alcohol-polymer phase is passed through a pressure reducing valve 73 for reducing it to a pressure in the range of atmospheric to 1000 p. s. i. The mixture then flows into a low pressure separator 74 at the substantially reduced pressure. Excess ethylene flashes from the reaction mixture and can be recycled through line 75 to the source of ethylene feed and into line 50 before compressor 51 or at a point in the line between cooler 54 and pump 55. An aqueous slurry of polyethylene containing from 5 to about 20 percent by weight of polyethylene and preferably between about 5 and 15 percent thereof is delivered through a line 76 to a separation system 77 wherein the polymer is freed of the aqueous solution of tertiary butyl alcohol and water, preferably by use of a vacuum drying step. The aqueous solution evaporated from the polymer and withdrawn through line 78 can be reused in further polymerization in the manner described with reference to Fig. 1.

The process as herein described with reference to Fig. 2 provides a discontinuous dispersed ethylene phase in aqueous alcohol in the ratio preferably of about 40 parts by weight of ethylene to 60 parts by weight of the aqueous phase, although this ratio can vary from about 10 parts by weight of ethylene to 90 parts by weight of aqueous phase, to about 75 parts by weight of ethylene to 25 parts by weight of aqueous phase. This system provides, even at lower relative water quantities, a complete aqueous envelope for the polymerizing ethylene, and a large volume of carrier medium for the polyethylene.

The following examples are pilot plant tests illustrating effects of operating conditions in more simplified apparatus.

EXAMPLE 1

Approximately 90 grams of ethylene containing 17 parts per million of oxygen were charged to a reactor containing 130 cc. of aqueous solution of tertiary butyl alcohol. The concentration of the tertiary butyl alcohol in water was 15 percent. Diethyl peroxydicarbonate in a weight concentration of 0.05 percent based on the ethylene charge was contained in the aqueous alcohol solution. An average pressure of 4980 p. s. i. g. and a temperature between about 50° and 58° C. were maintained for a period of four hours. Polyethylene formed during the reaction period transferred to the water phase and a wet, milk-like, temporary slurry was formed which was readily removed from the reactor. A conversion of 3.7 percent by weight of the ethylene was obtained to form polymer which had a specific viscosity of $12.100 \times 10^{-5}$ and which provided tough and flexible polyethylene films.

EXAMPLE 2

The reactor was charged with 130 cc. of aqueous solution containing 25 weight percent of tertiary butyl alcohol. The catalyst was diethylperoxydicarbonate in a concentration of 0.1 weight percent based on the ethylene charged. About 90 grams of ethylene containing 17 parts per million of oxygen were pumped into the reactor. An average pressure of 4460 p. s. i. g. and a temperature between about 50° and 58° C. were maintained for a period of 4 hours. A conversion of 7.6 weight percent of polyethylene based on the total weight of ethylene was obtained in a wet paste-like slurry that was readily separable from the reactor. The product had a specific viscosity of $15,200 \times 10^{-5}$ and formed tough and flexible film.

EXAMPLES 3–8

The data obtained in six continuously operated runs in which an aqueous solution of tertiary butyl alcohol was employed in the reaction medium and in which diethylperoxydicarbonate was employed as catalyst are shown in Table 1. It will be observed that an excellent utilization of catalyst was obtained except when a relatively low temperature of 55° C. was employed and when, as in Example 8, the residence time was greatly reduced. This is shown in Example 8 by the reported reduction in reactor capacity, pumping rates having been kept uniform; the residence time in Example 8 was only six minutes. As shown by the variations in reported melt viscosities, it can be seen that variations in temperature and pressure exert a pronounced effect on melt viscosity and that lower temperatures and elevated pressures within the disclosed ranges are preferred when, as is usually the case, a low melt viscosity is desired for utilization of the polymer in molding, or the like, to produce commercial articles. It was found that the products from the above runs had a substantially improved brittle temperature, some 20° lower than the brittle temperature of polymer produced in the presence of a 95 per cent aqueous solution of tertiary butyl alcohol.

EXAMPLE 9

The reactor was charged with 122 grams of ethylene and about 50 cc. of aqueous alcohol solution containing 10 percent by weight of tertiary butyl alcohol. Diethylperoxydicarbonate in a concentration of 0.10 percent by weight of the employed ethylene was used as catalyst. A temperature of 55° C. and an average pressure of 5415 p. s. i. g. were maintained throughout the reaction period. A conversion of 9.5 weight percent was obtained. The polyethylene product exhibited a specific viscosity of $15,000 \times 10^{-5}$ and formed tough and flexible film.

EXAMPLE 10

The reactor was charged with 107 grams of ethylene, an equal weight of a deaerated 25 weight percent solution of aqueous methanol, and 18.9 grams of deaerated C. P. benzene as a modifying agent. The catalyst consisted of 0.05 weight percent, based on the weight of the ethylene, of diethylperoxydicarbonate. The reaction mixture was heated in an autoclave under 15,000 p. s. i. g., that was maintained by pumping water to the reaction vessel, and at a temperature of 55° C. for a period of 4 hours. A conversion of 9.7 percent of the ethylene charged was obtained as high molecular weight polyethylene having a specific viscosity of $23,400 \times 10^{-5}$, a melt viscosity of $6.4 \times 10^7$, and forming a tough and flexible film.

The invention having been described, the following is claimed:

1. In a process of polymerizing ethylene at an elevated temperature and pressure in the presence of a diperoxydicarbonate ester catalyst to form normally solid polyethylene, the improved method of operation comprising: introducing ethylene and an aqueous solution of an alcohol selected from the group consisting of methanol and tertiary butanol, in which the concentration of the said alcohol is between 5 and 40 percent based on the total weight of the aqueous solution, into a polymerization zone under the said elevated pressure to form a plurality of separate phases comprising an ethylene phase and an aqueous alcohol phase; polymerizing ethylene therein at the said elevated temperature and pressure; internally recycling reaction mixture comprising the said phases and so-formed polyethylene, under substantially polymerization pressure to mix the said phases and transfer the said polyethylene into the said aqueous alcohol phase within the polymerization zone while effecting heat interchange with the recycled phases to maintain a substantially uniform polymerization temperature; withdrawing another portion of re-

*Table 1*

ETHYLENE POLYMERIZATION IN ALCOHOL-WATER SYSTEM

| Run No. | Conc. of t-butanol, percent | Reactor Capacity, Vol., Units | Press., p. s. i. g. | Temp., °C. | C₂H₄ in Feed, Wt. percent | Cat.,[1] percent of C₂H₄ | Production, lb./hr. | Spec. Vis. ×10⁵ | Melt Vis. | Yield Strength (p. s. i.) | Total Elong., percent | Lbs. Polymer per lb. cat. |
|---|---|---|---|---|---|---|---|---|---|---|---|---|
| 3 | 13 | 4.5 | 10,000 | 86 | 40 | 0.012 | 0.92 | (2) | $8.0 \times 10^7$ | 1,700–2,130 | 72–163 | 1,800 |
| 4 | 15 | 4.5 | 10,000 | 87 | 40 | 0.010 | 0.75 | (2) | $2.5 \times 10^7$ | 1,960–2,050 | 137–152 | 2,200 |
| 5 | 14 | 4.5 | 10,000 | 55 | 38 | 0.013 | 0.10 | 32,000 | $1.0 \times 10^8$ | 1,650–2,240 | 83–263 | 200 |
| 6 | 13 | 4.5 | 14,500 | 88 | 34 | 0.012 | 0.50 | 47,000 | $1.0 \times 10^8$ | 1,930–2,080 | 113–138 | 1,000 |
| 7 | 15 | 4.5 | 14,500 | 90 | 23 | 0.006 | 0.90 | 47,000 | $6.0 \times 10^7$ | 1,780–2,110 | 81–493 | 4,500 |
| 8 | 14 | 0.2 | 14,500 | 88 | 17 | 0.033 | 0.09 | 23,000 | $1.5 \times 10^7$ | | | 100 |

[1] Diethyl peroxydicarbonate.
[2] Staudinger method.

action mixture from the polymerization zone in the proportion of 1 part by weight to between 3 and 30 parts by weight of the internally recycled reaction mixture; separating ethylene alcohol phase from aqueous alcohol phase containing polyethylene and returning so-separated ethylene phase to the polymerization zone in the proportion of 1 part by weight to between 3 and 30 parts by weight of the ethylene phase that is internally recycled with aqueous alcohol phase; continuing ethylene polymerization until the concentration of polyethylene in said aqueous alcohol phase is at most about 20 percent by weight, based on the total weight of the aqueous dispersion; flowing withdrawn effluent from which ethylene has been separated to a zone under a pressure substantially lower than the pressure in the polymerization zone; separating ethylene from polyethylene and aqueous alcohol solution in the low pressure zone; and recovering polyethylene from the separated aqueous alcohol phase.

2. The method of claim 1 in which the said aqueous solution of alcohol is from 25 percent to 90 percent of the total weight of the ethylene and aqueous alcohol reaction mixture.

3. The method of claim 1 in which reaction mixture is withdrawn and recycled to the polymerization zone at a rate in the range of 0.2 to 2 polymerization-zone volumes per minute.

4. A process of polymerizing ethylene to form normally solid polyethylene, the said process comprising admixing ethylene and from 25 percent to 90 percent, based on the total weight of the mixture, of an aqueous solution of an alcohol selected from the group consisting of methanol and tertiary butanol to form a plurality of separate phases, of which an aqueous phase contains from 5 to 40 percent by weight of the said alcohol, heating the reaction mixture to a temperature between about 55° and 100° C. under a pressure between about 4000 and 20,000 pounds per square inch gauge in the presence of a diperoxydicarbonate ester catalyst, having the general formula

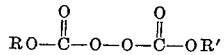

wherein R and R' are alkyl radicals, to effect polymerization of the ethylene in an ethylene phase, continuously agitating the reaction mixture to effect transfer of so-formed polyethylene from an ethylene phase into the aqueous phase, continuing ethylene polymerization until the concentration of polyethylene in said aqueous phase is at most about 20 percent by weight, and recovering normally solid polyethylene from the aqueous phase.

5. A process of polymerizing ethylene to form normally solid polyethylene, the said process comprising admixing ethylene and from 25 percent to 90 percent, based on the total weight of the mixture, of an aqueous solution containing from 5 to 40 percent by weight of an alcohol selected from the group consisting of methanol and tertiary butanol, to form a plurality of separate phases, heating the reaction mixture to a temperature between about 55° and 100° C. under a pressure between about 4000 and 20,000 pounds per square inch gauge in the presence of a diperoxydicarbonate ester having the general formula

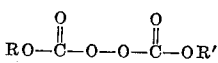

wherein R and R' are alkyl radicals to effect polymerization of the ethylene in an ethylene phase, continuously agitating the reaction mixture to effect transfer of so-formed polyethylene into the aqueous phase, maintaining the said agitation and the said temperature and pressure of the reaction mixture until the concentration of polyethylene dispersed in the aqueous phase is at most about 20 percent by weight based on the total weight of the aqueous dispersion, and recovering normally solid polyethylene from the said aqueous dispersion.

6. A process of polymerizing ethylene to form normally solid polyethylene, which process comprises passing ethylene at a pressure between about 4000 and 20,000 pounds per square inch gauge upwardly through a continuous aqueous phase contained in a reaction zone, introducing into said reaction zone as the continuous aqueous phase a 5 to 40 weight percent aqueous solution of tertiary butanol at a rate such as to constitute from 25 to 90 percent of the total weight of the reaction mixture, effecting polymerization of the ethylene at the said pressure and at a temperature between about 55° and 100° C. in the presence of said aqueous phase and of a catalytic amount of a dialkylperoxydicarbonate ester catalyst, continuously agitating the reaction mixture to effect transfer of so-formed polyethylene to the aqueous phase, continuing ethylene polymerization until the concentration of polyethylene in an effluent aqueous phase is at most about 15 percent by weight based on the total weight of the aqueous dispersion, withdrawing aqueous phase containing dispersed polyethylene, withdrawing unreacted ethylene from the reaction zone, and recovering normally solid polyethylene from the aqueous phase.

7. A process of polymerizing ethylene to form normally solid polyethylene, the said process comprising introducing ethylene at a pressure between about 4000 and 20,000 pounds per square inch gauge into a reaction zone, flowing the ethylene through the said reaction zone and upwardly through a continuous aqueous phase contained in said reaction zone, introducing water containing in solution from 5 percent to 25 percent by weight of tertiary butanol into the reaction zone to form said continuous aqueous phase that constitutes from 25 to 90 percent of the total weight of the reaction mixture, effecting polymerization of the ethylene at the said pressure and at a temperature between about 55° and 100° C. in the presence of the said aqueous phase and of a catalytic amount of a diperoxydicarbonate ester having the general formula

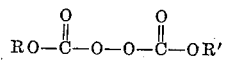

wherein R and R' are alkyl radicals, continuously agitating the reaction mixture to effect transfer of so-formed polyethylene to the aqueous phase, continuing said polymerization until the concentration of polyethylene in the said aqueous phase is at most about 15 percent by weight based on the total weight of the aqueous phase, continuously withdrawing and recycling reaction mixture to the reaction zone at a rate in the range of 0.2 to 2 reactor volumes per minute, withdrawing reaction mixture to a high pressure separating zone, therein separating a solution of ethylene in tertiary butanol from a slurry of polyethylene in aqueous tertiary butanol, recycling said solution to said reaction zone, releasing said slurry to a zone of reduced pressure to effect a vaporization of ethylene, separating vaporous ethylene from said slurry and separating polyethylene from said slurry.

8. In a continuous process of polymerizing ethylene at an elevated temperature and pressure in the presence of a diperoxydicarbonate ester catalyst to form normally solid polyethylenes, the improved method of operation which comprises admixing ethylene and from 25 to 90 percent, based on the total weight of the mixture, of an aqueous solution of an alcohol selected from the group consisting of methanol and tertiary butanol, subjecting the resultant mixture to said elevated temperature and pressure to effect polymerization of ethylene and to form within the polymerization reaction zone a plurality of phases, of which an aqueous phase contains from 5 to 40 percent by weight of said alcohol, agitating the reaction mixture to effect transfer of normally solid polyethylenes from an ethylene phase into said aqueous solution, continuing ethylene polymerization until the concentration of normally solid polyethylenes in said aqueous solution is at most about 20 percent by weight, continuously withdrawing reaction mixture to a high pressure separating zone, therein separating a solution of ethylene in said alcohol from an immiscible slurry of normally solid polyethylene in aqueous alcohol, withdrawing said slurry from said high pressure separating zone, substantially reducing the pressure on withdrawn slurry and thereafter separating normally solid polyethylenes from said slurry.

9. The process of claim 8 wherein said alcohol is methanol.

10. The process of claim 8 wherein said alcohol is tertiary butanol.

References Cited in the file of this patent

UNITED STATES PATENTS

| Number | Name | Date |
|---|---|---|
| 2,396,920 | Larson | Mar. 19, 1946 |
| 2,409,996 | Roedel | Oct. 22, 1946 |
| 2,414,311 | Larson | Jan. 14, 1947 |